US012744786B1

(12) United States Patent
Christophe et al.

(10) Patent No.: US 12,744,786 B1
(45) Date of Patent: Sep. 22, 2026

(54) PERMISSION CONTROLS FROM A FIRST PROVIDER FOR A SECOND PROVIDER

(71) Applicant: Amazon Technologies, Inc., Seattle, WA (US)

(72) Inventors: Pierrot Christophe, Liberty Township, OH (US); Magdalena Hawkins, Valley Cottage, NY (US)

(73) Assignee: Amazon Technologies, Inc., Seattle, WA (US)

( * ) Notice: Subject to any disclaimer, the term of this patent is extended or adjusted under 35 U.S.C. 154(b) by 90 days.

(21) Appl. No.: 18/970,015

(22) Filed: Dec. 5, 2024

(51) Int. Cl.
*H04L 29/06* (2006.01)
*H04L 9/40* (2022.01)

(52) U.S. Cl.
CPC .......... *H04L 63/102* (2013.01); *H04L 63/105* (2013.01); *H04L 63/20* (2013.01)

(58) Field of Classification Search
CPC ....... G06F 21/62; H04L 63/10; H04L 63/102; H04L 63/105; H04L 63/20
See application file for complete search history.

(56) References Cited

U.S. PATENT DOCUMENTS

| | | | | |
|---|---|---|---|---|
| 11,699,150 | B2 * | 7/2023 | Ranganathan | G06Q 20/3821 705/44 |
| 2003/0216990 | A1 * | 11/2003 | Star | G06Q 20/108 705/35 |
| 2018/0367407 | A1 * | 12/2018 | Anandam | G06F 8/61 |
| 2019/0384922 | A1 * | 12/2019 | Jamkhedkar | H04L 67/60 |
| 2020/0396072 | A1 * | 12/2020 | Maurer | G06F 16/2379 |
| 2021/0319123 | A1 * | 10/2021 | Jamkhedkar | G06F 16/9024 |
| 2022/0005039 | A1 * | 1/2022 | Hires | G06Q 20/4014 |
| 2023/0418974 | A1 * | 12/2023 | Hockey | H04W 12/106 |
| 2026/0095453 | A1 * | 4/2026 | Redlich | H04L 63/101 |
| 2026/0105173 | A1 * | 4/2026 | Ghilai | G06F 21/6218 |

* cited by examiner

*Primary Examiner* — Malcolm Cribbs
(74) *Attorney, Agent, or Firm* — Kilpatrick Townsend & Stockton LLP

(57) ABSTRACT

Techniques for permission controls from a first provider for a second provider are described. In an example, a computer system stores first account data of a user with a first service provider. The first account data enables execution of a first online service of the first service provider to provide a second online service of a second service provider. The computer system receives second account data of the user with the second service provider. The computer system generates, based on a mapping between a first schema of the second account data and a second schema, third account data. The computer system generates, based on the first account data and the third account data, a report associated with controlling execution of the second online service. The computer system sends permission data to the second service provider indicating whether a permission exists to control the execution of the second online service.

20 Claims, 8 Drawing Sheets

PERMISSION CONTROLS FROM A FIRST PROVIDER FOR A SECOND PROVIDER

BACKGROUND

Services can be provided through online systems with various processing components. Various methods may be used to perform a service. Each of the processing components may handle large amounts of data and, as such, be associated with access controls for security and with a processing latency. To be effective or relevant, certain services may need to be provided with a short processing latency, such as in real-time or near real-time, while access may still remain to be secure.

BRIEF DESCRIPTION OF THE DRAWINGS

Various embodiments in accordance with the present disclosure will be described with reference to the drawings, in which.

DETAILED DESCRIPTION

Figure 1:
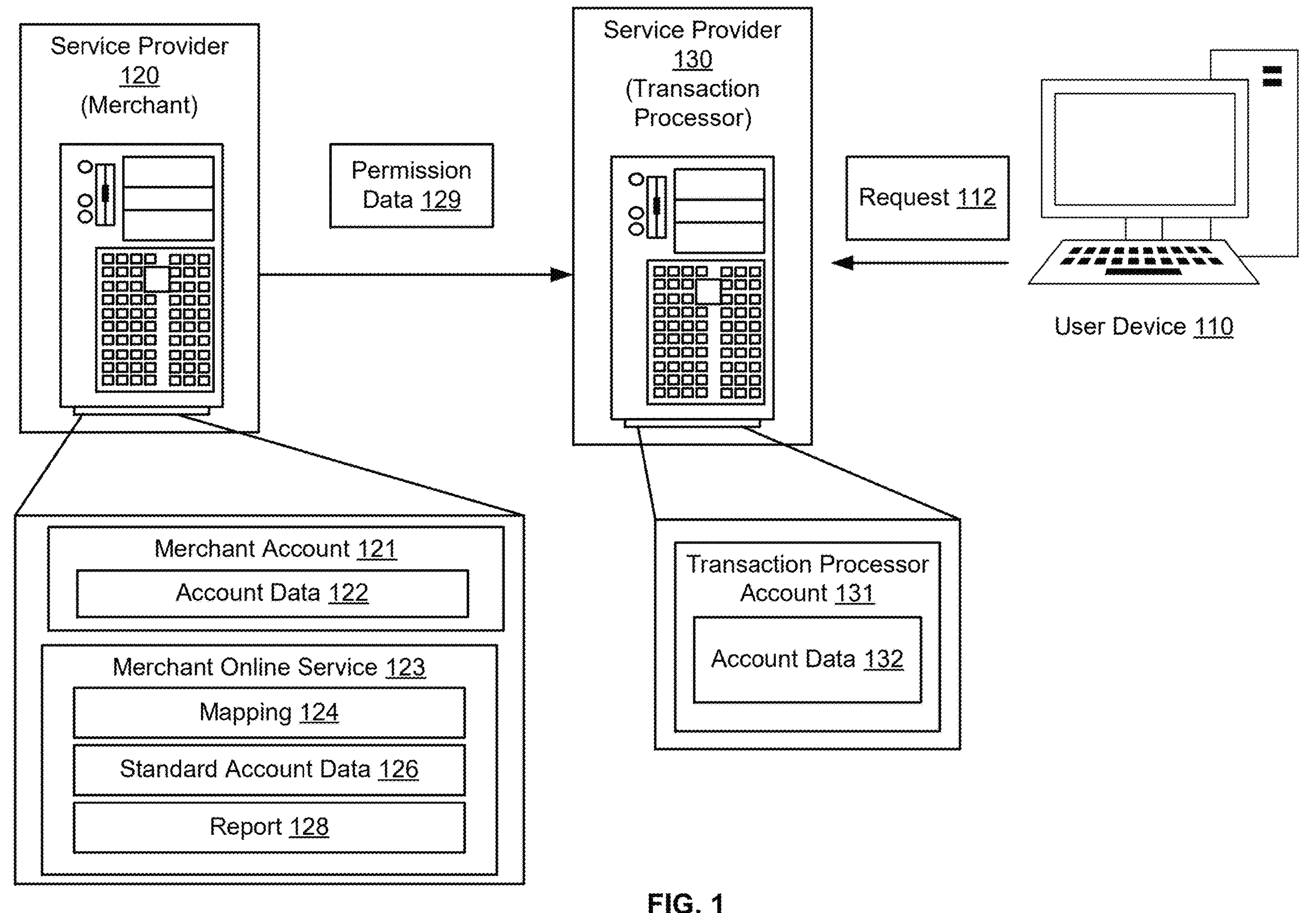
FIG. 1 illustrates an example of a system for service provider permission controls, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, permission controls from a first provider (e.g., a merchant) for a second provider (e.g., a transaction processor). A user may have a first account with the first service provider that is linked to a second account of the user with the second provider. In an example, a computer system stores first account data of the first account. In addition, the computer system receives second account data of the second account. The computer system reformats the second account data into a standard schema. The computer system then generates a report associated with controlling execution of an online service of the second provider based on the first account data and the reformatted second account data. The computer system generates and sends permission data to the second provider indicating whether a permission exists for executing the online service. The second provider can use the permission data in real-time or near real-time relative to when requests for executing the online service are received from the user to control the execution of the online service.

To illustrate, consider a merchant that handles online transactions. A user associated with the merchant (e.g., an employee thereof) can have an account with the merchant. The user can also have an account with a bank that can be linked with their account with the merchant. The merchant receives account data of the user from the bank that includes identifiers of the user as well as permission information of the user for the bank (e.g., the user is permitted to authorize any transaction up to a limit of $10,000). The merchant standardizes the account data into a standard schema based on a mapping between a schema of the account data and the standard schema. The merchant then uses the standardized account data and merchant account data of the user that includes identifiers of the user as well as permission information of the user (e.g., permission level three) to generate a report associated with controlling execution of a transaction service of the bank. The report indicates whether a permission exists for executing the transaction service. For instance, the merchant determines that the permission level three is associated with a transaction limit of $15,000, so the report indicates the permission exists for executing the transaction service for transactions up to $15,000. The merchant then sends permission data to the bank indicating that the permission exists for executing the transaction service for transactions up to $15,000. So, the bank can use the permission data to control the execution of the transaction service for the user.

Embodiments of the present disclosure provide technical improvements over conventional techniques for a first service provider providing permission controls for a second service provider. Generally, the service provider can enable the execution of an online service of the second service provider by relying on account data related to the execution. The account data can span accounts of a same user with the first service provider and the second service provider. Relative to conventional systems, security and efficiency of executing the online service are improved according to embodiments of the present disclosure. Particularly, because the account data is standardized across both accounts according to a schema, reporting can be created for controlling the execution and data therefrom can be sent (e.g., via a push) to resources of the first service provider and/or second service provider. Based on the data, the execution can be permitted or prevented, thereby improving the security (e.g., because of the reported permissions standardized across both account) and the efficiency of the execution (e.g., by avoiding the need to execute subsequent mitigation action in case an unpermitted execution was actually performed). Accordingly, the execution of the online service becomes more secure and efficient.

FIG. 1 illustrates an example of a system for service provider permission controls, according to an embodiment of the present disclosure. In an example, a service provider 120 may be a merchant associated with online transactions and a service provider 130 may be a transaction processor, such as a bank. In the illustrative use case of online transactions, the account data may be related to a transaction instrument, such as a credit card, or a transaction operation, such as a loan. The embodiments of the present disclosure are not limited as such and similarly and equivalently apply to other services. For instance, the transaction instrument can include the use of tokens, credentials, etc. to access a set of computing services (e.g., in the use case of information technology (IT), the user can be an IT person, whereby the transaction instrument may allow them to instantiate virtual machines or configure a computer network).

In an example, the user can have a merchant account 121 associated with the service provider 120 and a transaction processor account 131 associated with the service provider 130. The user may have previously linked the merchant account 121 and the transaction processor account 131. The merchant account 121 stores account data 122 of the user associated with the service provider 120. For instance, the account data 122 may include identifying information of the user (e.g., a name, address, phone number, etc.) and permission information (e.g., a permission level) of the user. In addition, the transaction processor account 131 stores account data 132 of the user associated with the service provider 130. The account data 132 may also include identifying information of the user, a login history to the online merchant, permission data for services provided by the service provider 130, etc.

The service provider 120 can integrate the service provider 130 for executing a merchant online service 123 of the service provider 120 to provide a service (e.g., payment authorization, loan authorization, etc.) of the service provider 130. The account data 122 enables the execution of the merchant online service 123 to provide the service of the service provider 130. To do the integration, the service provider 120 can generate an API call to a computing resource (e.g., a server, a computer system, etc.) of the service provider 130. The API call indicates requests the account data 132 of the user with the service provider 130. The service provider 130 determines a response to the API call that includes the account data 132 of the user.

In an example, the account data 132 may have a schema that is different from a standardized schema that is used by the service provider 120. So, the service provider 120 can use a mapping 124 between the schema of the account data 132 and the standardized schema to generate standard account data 126. For instance, a username of the user may be indicated in a column titled "accessid" in the account data 132. In the standardized schema, the username of the user can be indicated in a column titles "UserAlias". So, the service provider 120 can reformat the username in the account data 132 from "accessid" to "UserAlias" to generate the standard account data 126.

Once the service provider 120 generates the standard account data 126, the service provider 120 can generate a report 128 associated with controlling execution of the service of the service provider 130 based on the account data 122 and the standard account data 126. The report 128 can indicate whether a permission exists for executing the service. For instance, if the account data 122 indicates that the user has a particular permission level with the service provider 120 that corresponds to being authorized for transactions up to a threshold amount (e.g., $10 million), then the report 128 can indicate the permission for transactions of the threshold amount. The service provider 120 sends permission data 129 to the service provider 130 indicating whether the permission exists. For example, the permission data 129 indicates the permission for transactions of the threshold amount.

In an example, once the service provider 130 is integrated into the merchant online service 123 to provide the service of the service provider 130, the user may send a request 112 to the service provider 130 on a user device 110, which is illustrated in FIG. 1 as a desktop computer. The request 112 is associated with the merchant online service 123 for execution of the service of the service provider 130. For example, the request 112 may be to perform a transaction of $5 million using the service provider 130. The execution of the service can be controlled based on the permission data 129. For instance, the service provider 130 may determine that since the permission data 129 includes the permission for the transaction amount, the service provider 130 is permitted to perform the execution of the service. So, the service provider 130 can perform the transaction associated with the request 112. If the request 112 is for a transaction amount greater than the threshold amount, the service provider 130 can determine that the permission data 129 excludes the permission for the transaction amount, so the service provider 130 is to be prevented from performing the execution of the service.

In some instances, the service provider 130 can forward the request 112 to the service provider 120 to verify the permission. For example, the service provider 130 can send an API call indicating the request 112 to the service provider 120. Based on the account data 122 and the permission data 129, the service provider 120 can respond to indicate whether the execution of the service of the service provider 130 is to be permitted or prevented.

Figure 2:
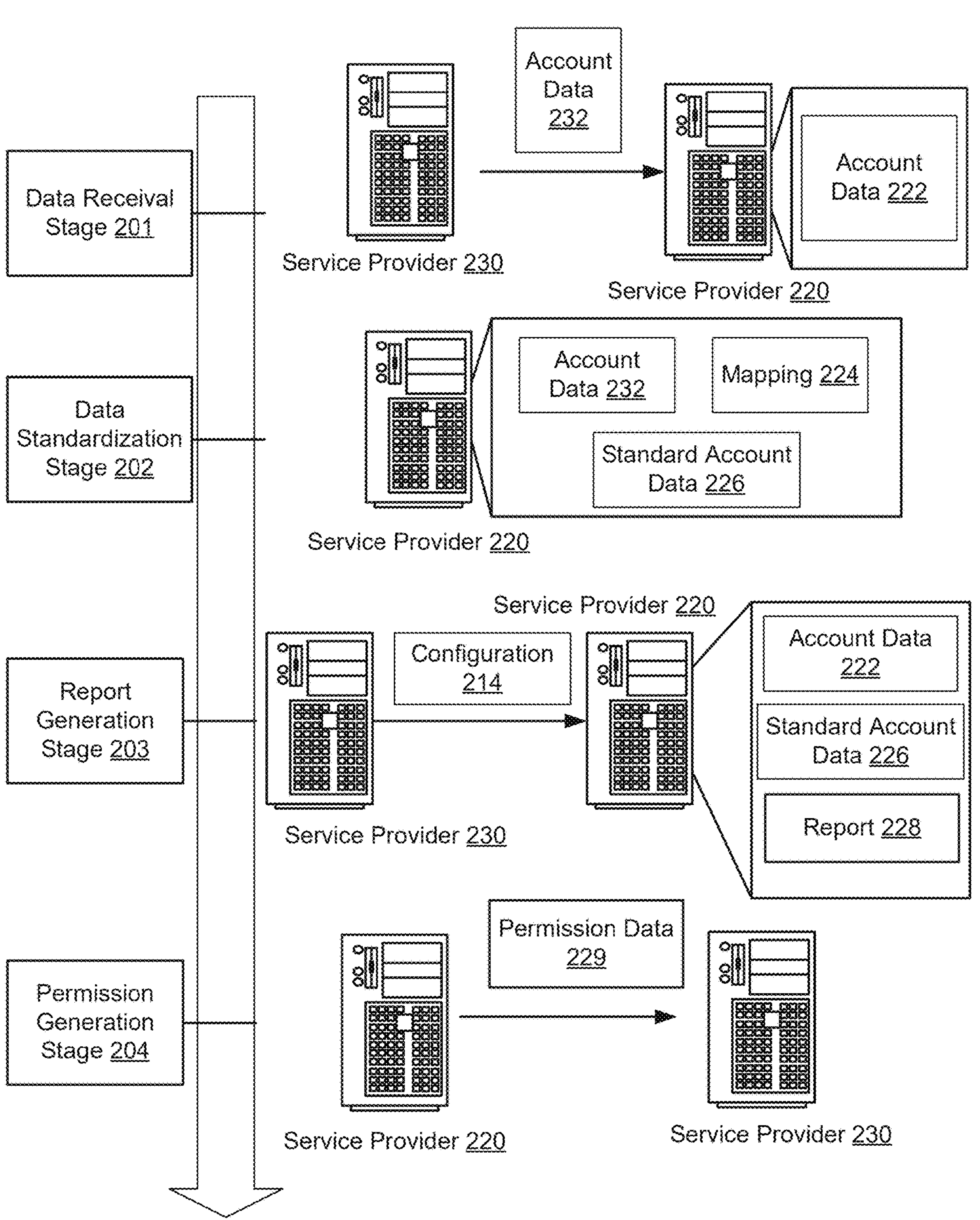
FIG. 2 illustrates an example of stages of integrating service provider operation controls into another service provider, according to an embodiment of the present disclosure.

FIG. 2 illustrates an example of stages of integrating service provider operation controls into another service provider, according to an embodiment of the present disclosure. The stages include a data receival stage 201, a data standardization stage 202, report generation stage 203, and a permission generation stage 204.

In an example, the data receival stage 201 involves a service provider 220 receiving account data 232 from a service provider 230. The service provider 220 is an example of the service provider 120 in FIG. 1 and the service provider 230 is an example of the service provider 130 in FIG. 1. The account data 232 includes information of a user associated with the service provider 230. The account data 232 has a first schema. In addition, the service provider 220 receives account data 222 that includes information of the user associated with the service provider 220. The service provider 220 may store the account data 222 locally or may access the account data 222 from a remote storage location. The account data 222 can enable execution of an online service (e.g., merchant online service 123 in FIG. 1) of the service provider 220 to provide an online service of the service provider 230.

In an example, the data standardization stage 202 involves the service provider 220 generating standard account data 226 based on the account data 232. The service provider 220 uses a mapping 224 between the first schema of the account data 232 and a second schema of the standard account data 226 to generate the standard account data 226. The mapping 224 may be received as a user input via a user interface of a user device (e.g., user device 110 in FIG. 1). Alternatively, the service provider 220 may use a machine learning model to determine the mapping 224 between the first schema and the second schema.

In an example, the report generation stage 203 involves the service provider 220 generating a report 228 based on the account data 222 and the standard account data 226. The report 228 can be associated with controlling execution of the online service of the service provider 230. So, the report 228 can indicate whether a permission exists for executing the online service. To generate the report 228, the service provider 220 may receive an indication of a configuration 214 for the report 228 from the service provider 230. The configuration 214 may specify functions that the online service is to be able to perform based on the report 228. The functions may be selectable from a list of options provided by the service provider 220. Upon receiving the configuration 214, the service provider 220 can determine how to generate the report 228 to provide the selected functions. For example, the configuration 214 may specify that the service provider 230 is to remove account data for users that have not logged in to their accounts within a particular time period (e.g., two years). So, based on the configuration 214, the service provider 220 determines that the report 228 is to indicate a time of a last login for the user. The service provider 220 then generates the report 228 based on the configuration 214, the account data 222, and the standard account data 226.

In an example, the permission generation stage 204 involves the service provider 220 sending permission data 229 to the service provider 230. The permission data 229 is generated based on the report 228 and indicates whether the permission exists. As such, the execution of the online service of the service provider 230 can be controlled based on the permission data 229, where controlling the execution can involve permitting or preventing the execution.

Figure 3:
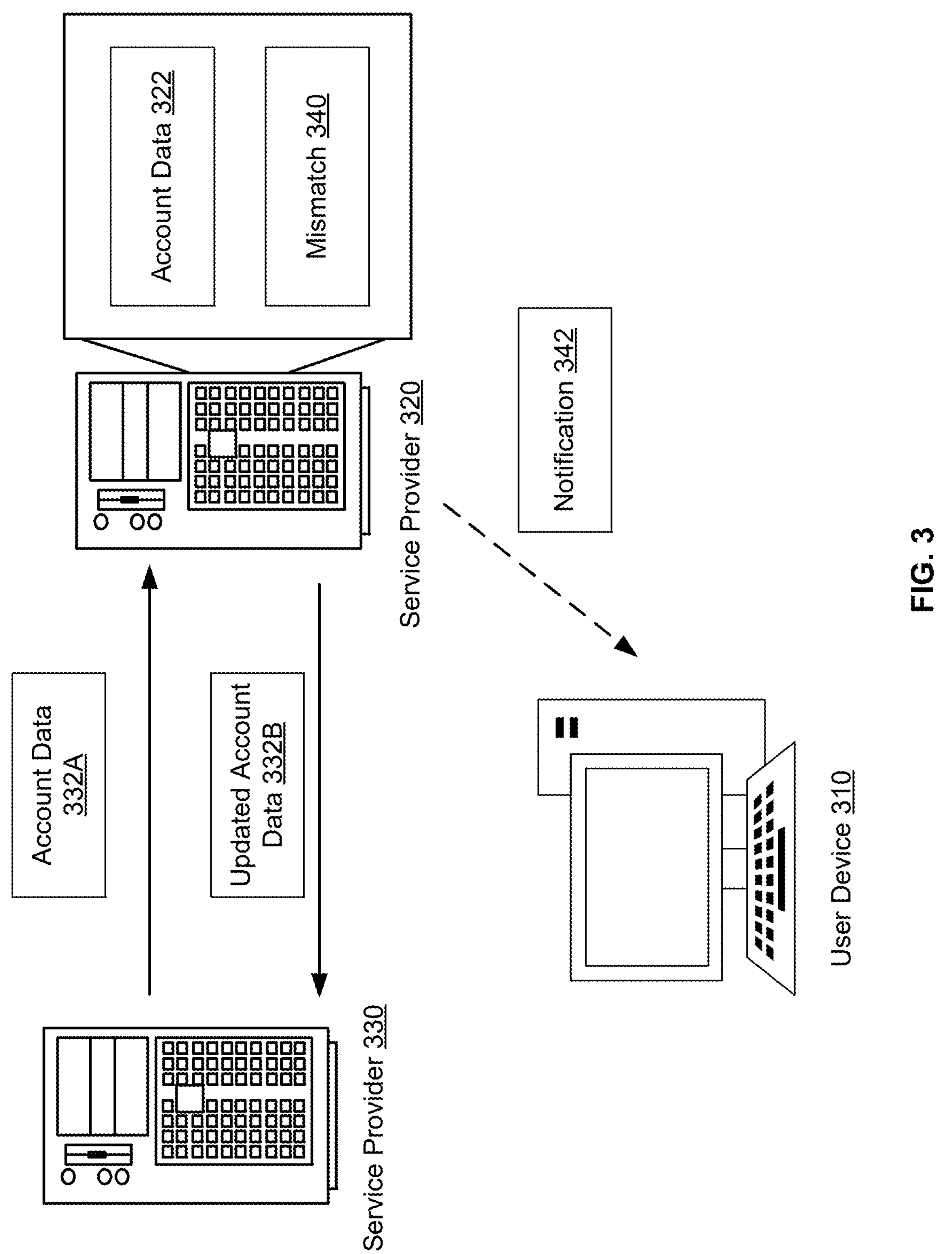
FIG. 3 illustrates an example of updating account data for a user associated with a service provider, according to an embodiment of the present disclosure.

FIG. 3 illustrates an example of updating account data for a user associated with a service provider, according to an embodiment of the present disclosure. A service provider 330, which is an example of the service provider 130 in FIG. 1, can be integrated with a service provider 320, which is an example of the service provider 120 in FIG. 1, for providing an online service of the service provider 330. Once integrated, account data 332A of a user associated with the service provider 330 can be periodically verified against account data 322 of the user associated with the service provider 320 to ensure accurate permissions are enforced for the user.

In an example, the service provider 320 can receive the account data 332A for the user from the service provider 330. The account data 332A includes user identifying information and user permission information (e.g., transaction limits, entitlement limits, etc.) for the user. The service provider 320 can compare the account data 332A to the account data 322 for the user to determine whether they match. The account data 322 can also include user identifying information as well as permission indicators for the user. Upon determining a mismatch 340 between the account data 322 and the account data 332A, the service provider 320 can trigger a mitigation operation for the mismatch 340. For instance, the mitigation operation may involve causing a presentation of a notification 342 indicating the mismatch 340 at a user device 310. The notification 342 and the mismatch can be reviewed to determine the correct account data for the user. Feedback indicating the correct account data may then be received via the user device 310. The service provider 320 can send updated account data 332B that includes the correct account data to the service provider 330 so that the service provider 330 can accurately control execution of a service of the service provider 330.

In an example, the mitigation operation may involve the service provider 320 generating the updated account data 332B based on the mismatch 340 without sending the notification 342 and receiving feedback. The service provider 320 may generate the updated account data 332B to match the account data 322. The service provider 320 can then send the updated account data 332B to the service provider 330.

In an example, the account data 322 can indicate a permission level for the user associated with the execution of the service of the service provider 330. Higher permission levels can correspond to higher permission privileges. For instance, a permission level of five may correspond to a transaction amount limit of $10 million and a permission level of seven may correspond to a transaction amount limit of $50 million. Initially, the account data 322 stored by the service provider 320 may indicate the permission level of five for the user. So, the account data stored by the service provider 330 can include permission data (e.g., permission data 129 in FIG. 1) indicating the corresponding transaction amount limit of $10 million.

At some point, the permission level for the user may be updated to seven in the account data 322. Upon detecting the update, the service provider 320 can cause a presentation of a notification 342 indicating the update at the user device 310. The notification 342 can be reviewed to determine the correct account data associated with the updated permission level for the user. That is, the correct account data can be a transaction amount limit of $50 million for the user. Feedback indicating the correct account data may then be received via the user device 310. The service provider 320 can send updated account data 332B that includes the correct account data associated with the updated permission level to the service provider 330 so that the service provider 330 can accurately control execution of a service of the service provider 330. In an example, the service provider 320 can generate the updated account data 332B based on the update to the permission level without sending the notification 342 and receiving feedback. The service provider 320 may generate the updated account data 332B based on predefined permissions for each permission level. The service provider 320 can then send the updated account data 332B to the service provider 330.

In an example, at some point, the service provider 320 may detect a removal of the account data 322 from the service provider 320. This removal may indicate a disassociation of the user with the service provider 320. As a result, the user's permission to execute a service of the service provider 320 to provide the service of the service provider 330 is to be removed. So, the service provider 320 can send a notification of the removal to the service provider 330. Based on receiving the notification, the service provider 330 can update the permissions for the user indicated in the account data of the user to indicate a lack of permission for the user to execute the service of the service provider 320 to provide the service of the service provider 330.

Figure 4:
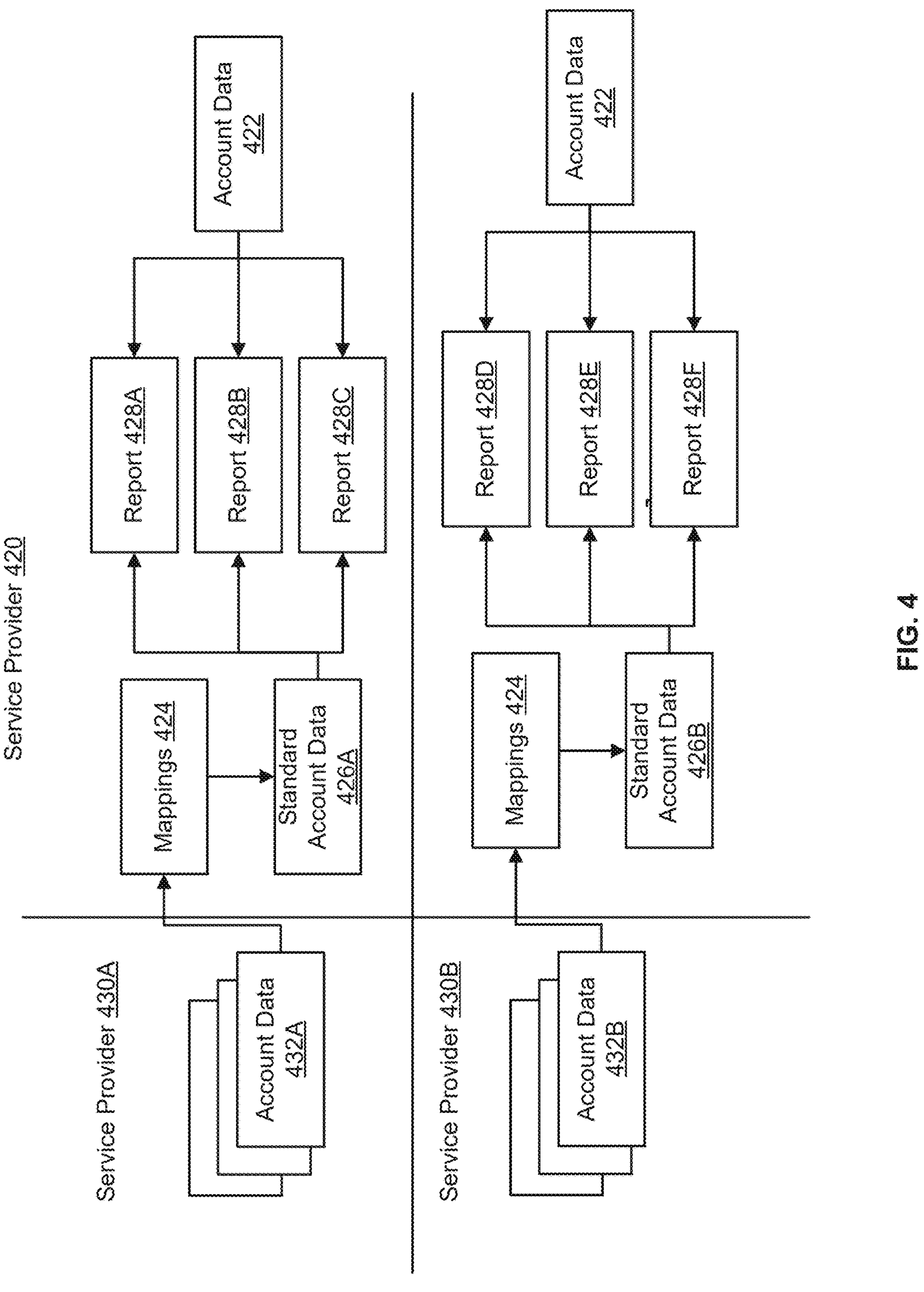
FIG. 4 illustrates an example of report generation for multiple users and multiple service providers, according to an example of the present disclosure.

FIG. 4 illustrates an example of report generation for multiple users and multiple service providers, according to an example of the present disclosure. Service provider 420 is an example of the service provider 120 in FIG. 1. Service providers 430A-430B are examples of the service provider 130 in FIG. 1. So, the service provider 420 may be a merchant and the service providers 430A-430B may be transaction processors.

In an example, execution of a service of the service provider 420 can provide services of the service providers 430A-430B. Each of the service providers 430A-430B includes account data 432A-432B. The account data 432A-432B can include user identifying information and permission information for multiple users associated with the service providers 430A-430B. The users may be the same or different between the service providers 430A-430B.

The service provider 420 receives the account data 432A-432B from each of the service providers 430A-430B. The service provider 420 generates standard account data 426A-426B using mappings 424 between the schemas of the account data 432A-432B and a schema for standard account data. For instance, the account data 432A of the service provider 430A may have a first schema, the account data 432B of the service provider 430B may have a second schema, and standard account data 426A-426B may have a third schema. So, the mappings 424 can include a first mapping between the first schema and the third schema and a second mapping between the second schema and the third schema. By using the first mapping for the account data 432A, the service provider 420 generates the standard account data 426A. In addition, by using the second mapping for the account data 432B, the service provider 420 generates the standard account data 426B. So, even if the schemas between the service providers 430A-430B are different, by using the mappings 424 to standardize the account data 432A-432B, the account data 432A-432B is reformatted to a standard schema. As a result, account data from various service providers can be aggregated and analyzed as long as a mapping exists for the service provider.

In an example, the service provider 420 generates reports 428A-428B based on the standard account data 426A-426B and account data 422. In particular, the service provider 420 generates reports 428A-428C from the standard account data 426A and the account data 422. In addition, the service provider 420 generates reports 428D-428F from the standard account data 426B and the account data 422. Each of the reports 428A-428C can be associated with a control over a service that users are permitted to provide via the service provider 430A. For example, the report 428A may be a user entitlement report indicating information about entitlement permissions for multiple users based on the standard account data 426A and the account data 422. In addition, the report 428B may be a user entitlement per account report indicating information about entitlement permissions for a particular user based on the standard account data 426A and the account data 422. The report 428C may be a user last login report indicating information about a last login of one or more users to their user accounts with the service provider 430A. Similarly, each of the reports 428D-428F can be associated with a control over a service that users are permitted to provide via the service provider 430B. For example, the report 428D may be a user entitlement report indicating information about entitlement permissions for multiple users based on the standard account data 426B and the account data 422. In addition, the report 428E may be a user entitlement per account report indicating information about entitlement permissions for a particular user based on the standard account data 426B and the account data 422. The report 428F may be a user last login report indicating information about a last login of one or more users to their user accounts with the service provider 430B based on the standard account data 426B and the account data 422.

In an example, the service provider 420 can generate a single report including the information of each of the reports 428A-428B. That is, the report can include information for multiple users across multiple online services of multiple service providers. The report can then be filtered into the reports 428A-428F for specific service providers and/or users.

Because the reports 428A-428F are associated with a control over a service, permission data can be generated based on the reports 428A-428F. The permission data can indicate whether a user has permission to execute the services of the service providers 430A-430B. The service provider 420 can send the permission data to the service providers 430A-430B so that the service providers 430A-430B can control execution of the services accordingly.

Figure 5:
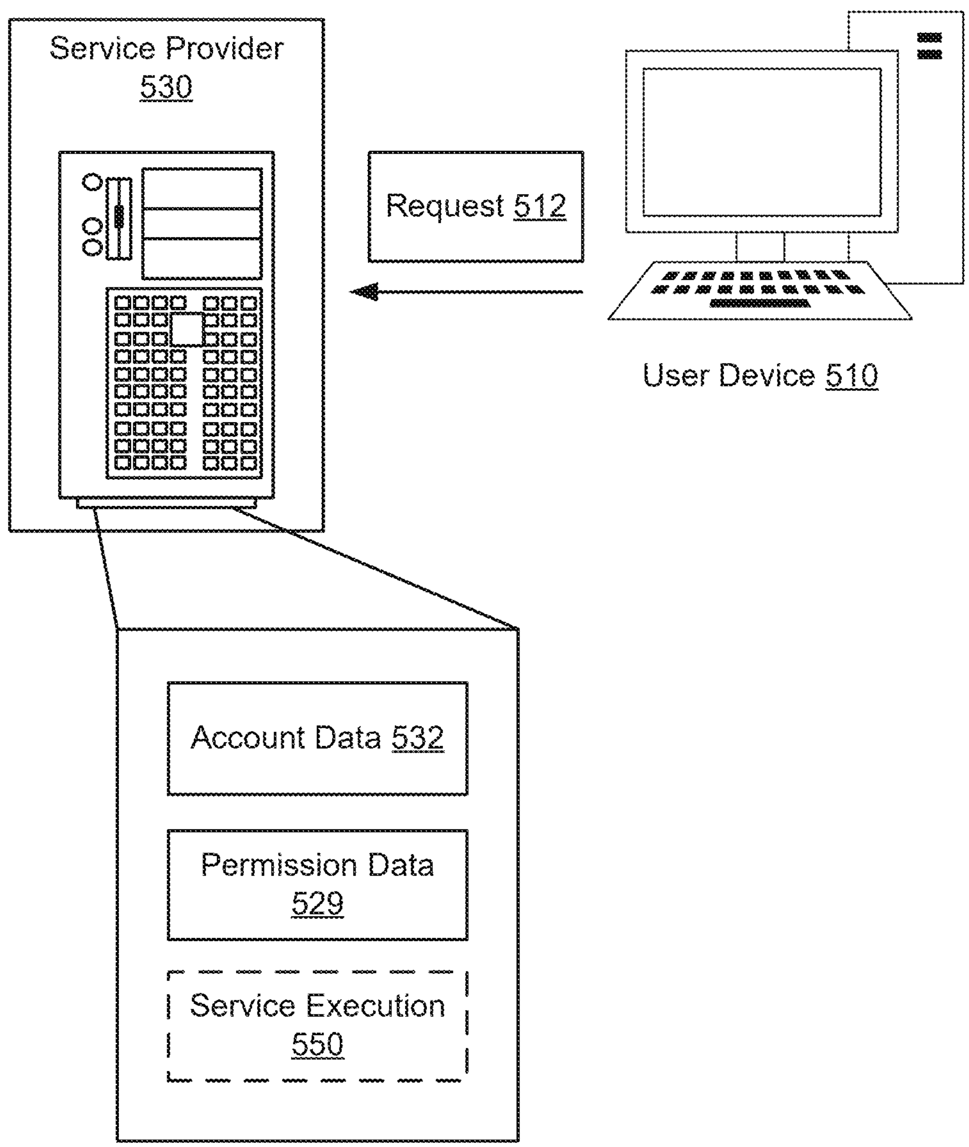
FIG. 5 illustrates an example of service execution control according to permission data, according to an embodiment of the present disclosure.

FIG. 5 illustrates an example of service execution control according to permission data, according to an embodiment of the present disclosure. A service provider 530, which is an example of the service provider 130 in FIG. 1, can be integrated with another service provider, (e.g., service provider 120 in FIG. 1) for providing an online service of the service provider 530. Once integrated, the service provider 530 receives permission data 529 from the other service provider. The permission data 529 indicates whether a user account has a permission for executing the online service of the service provider 530.

In an example, because the permission data 529 is generated based on a standardized version of account data 532 of a user with the service provider 530, downstream systems can be improved. That is, the account data 532 of the user is reformatted into standard account data, which is then used along with account data of the user with the other service provider to generate a report associated with controlling execution of the service provider 530. Execution and security of the service provider 530 and other downstream systems can depend on the report. So, by having accurate data in the report from which the permission data 529 is generated, resources can be provided or transferred accurately based on the permission data 529. In addition, the service provider 530 or other downstream systems may execute efficiently without consuming resources to communicate with the other service provider to determine the permissions associated with a user.

In an example, a user may send a request 512 to the service provider 530 on a user device 510. The request 512 is associated with an online service of the other service provider for execution of the service of the service provider 530. Service execution 550 can be controlled based on the permission data 529. For instance, the service provider 530 may determine that the permission data 529 includes the permission for executing the service of the service provider 530 for the request 512. So, the service provider 530 can perform the service execution 550 associated with the request 512. If the service provider 530 determines that the permission data 529 excludes the permission for executing the service of the service provider 530 for the request 512. So, the service provider 530 can prevent the service execution 550 associated with the request 512, as indicated by the dashed outline.

Figure 6:
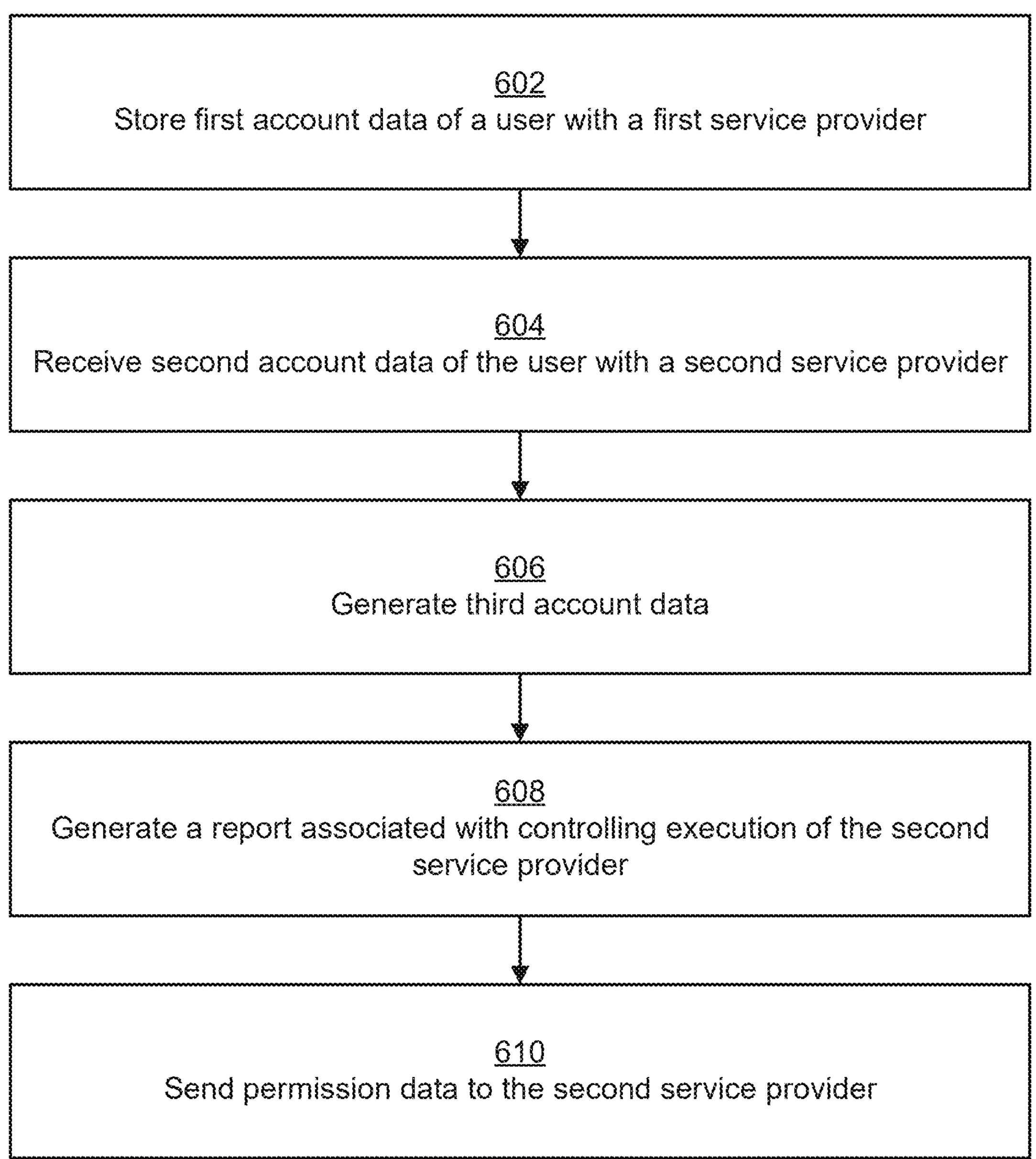
FIG. 6 illustrates an example flow of a process for generating permission controls for a service provider, according to an embodiment of the present disclosure.
Figure 7:
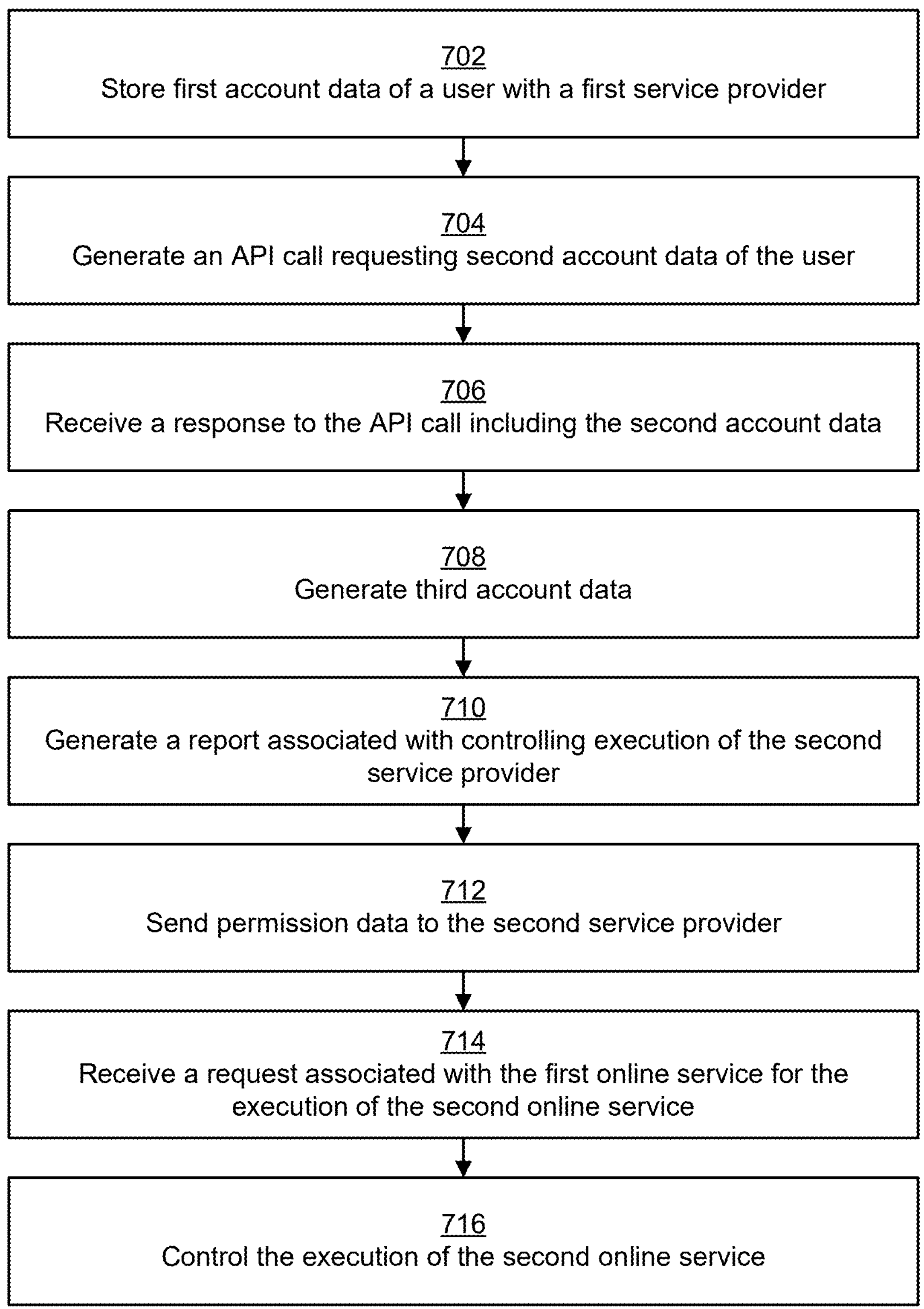
FIG. 7 illustrates another example flow of a process for generating and using permission controls for a service provider, according to an embodiment of the present disclosure.

FIGS. 6-7 illustrate example flows for processes associated with generating and using permission controls for a second service provider using a first service provider. Some or all of the processes (or any other processes described herein, or variations, and/or combinations thereof) may be performed under the control of one or more computer systems, such as the service provider 120 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 6 illustrates an example flow of a process for generating permission controls for a service provider, according to an embodiment of the present disclosure. In an example, the flow includes operation 602, where the computer system stores first account data of a user with a first service provider. The first account data enables execution of a first online service of the first service provider to provide a second online service of a second service provider.

In an example, the flow includes operation 604, where the computer system receives second account data of the user with a second service provider. The second account data is received from the second service provider. The second account data has a first schema.

In an example, the flow includes operation 606, where the computer system generates third account data. The computer system generates the third account data based on a mapping between the first schema and a second schema. The third account data is generated by reformatting the second account data from the first schema to the second schema.

In an example, the flow includes operation 608, where the computer system generates a report associated with controlling execution of the second service provider. The report is generated based on the first account data and the third account data. The report indicates whether a permission exists for executing the second online service.

In an example, the flow includes operation 610, where the computer system sends permission data to the second service provider. The permission data can be used to control the execution of the second online service.

FIG. 7 illustrates another example flow of a process for generating and using permission controls for a service provider, according to an embodiment of the present disclosure. In an example, the flow includes operation 702, where the computer system stores first account data of a user with a first service provider. The first account data enables execution of a first online service of the first service provider to provide a second online service of a second service provider.

In an example, the flow includes operation 704, where the computer system generates an API call requesting second account data of the user. The API call is sent to a computing resource of the second service provider. The second account data is of the user with the second service provider.

In an example, the flow includes operation 706, where the computer system receives a response to the API call including the second account data. The response is received from the computing resource. The second account data has a first schema.

In an example, the flow includes operation 708, where the computer system generates third account data. The computer system generates the third account data based on a mapping between the first schema and a second schema. The third account data is generated by reformatting the second account data from the first schema to the second schema.

In an example, the flow includes operation 710, where the computer system generates a report associated with controlling execution of the second service provider. The report is generated based on the first account data and the third account data. The report indicates whether a permission exists for executing the second online service.

In an example, the flow includes operation 712, where the computer system sends permission data to the second service provider. The permission data indicates whether the permission exists. The permission data is generated based on the report.

In an example, the flow includes operation 714, where the computer system receives a request associated with the first online service for the execution of the second online service.

In an example, the flow includes operation 716, where the computer system controls the execution of the second online service. The computer system can control the execution of the second online service by at least permitting or preventing the execution of the second online service based on the permission data.

Figure 8:
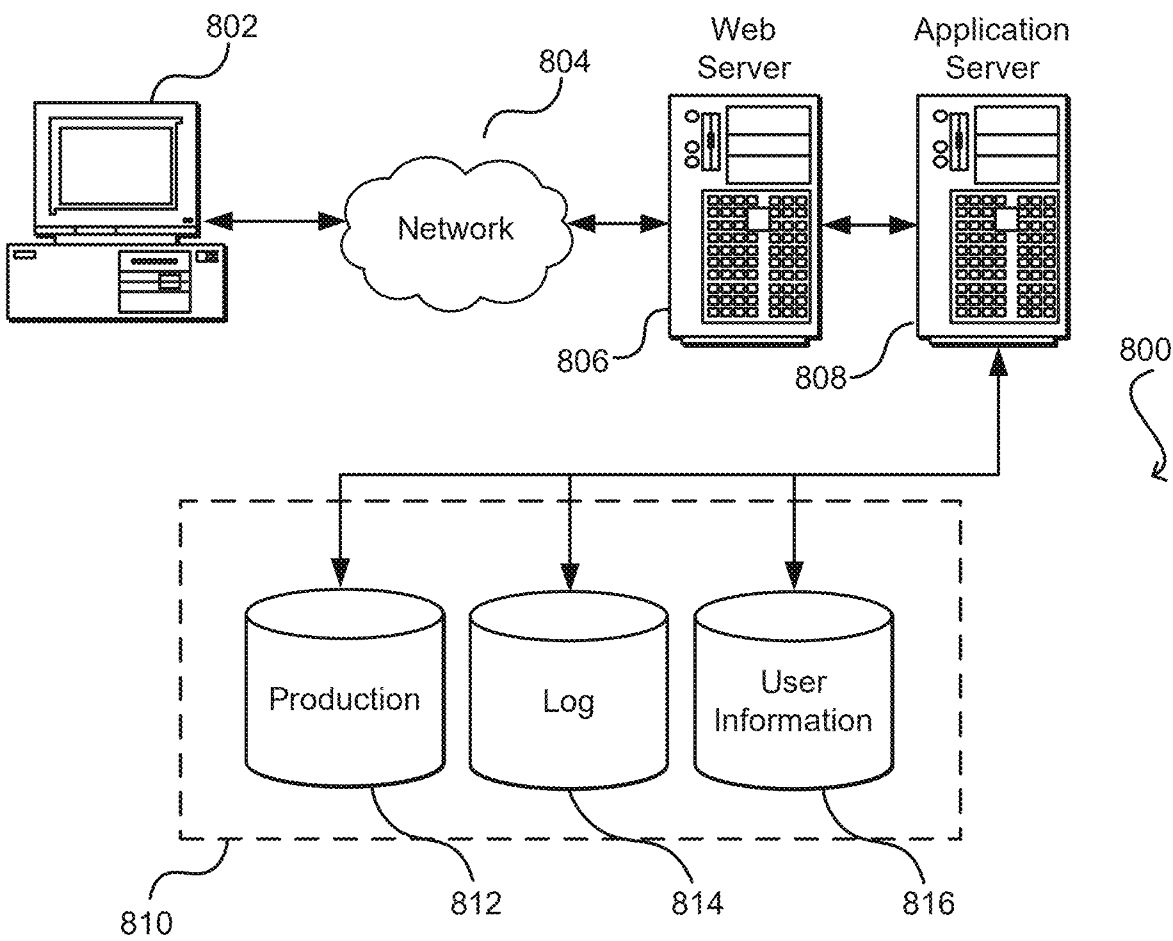
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system of a first service provider, the system comprising:

one or more processors; and one or more memory storing instructions that, upon execution by the one or more processors, configure the system to:

store first account data of a user with the first service provider, the first account data enabling execution of a first online service of the first service provider to provide a second online service of a second service provider;

generate an application programming interface (API) call to a computing resource of the second service provider, the API call requesting second account data of the user with the second service provider;

receive, from the computing resource, a response to the API call, the response including the second account data, the second account data having a first schema;

generate, based at least in part on a first mapping between the first schema and a second schema, third account data by reformatting the second account data from the first schema to the second schema;

generate, based at least in part on the first account data and the third account data, a report associated with controlling execution of the second online service, the report indicating whether a permission exists for executing the second online service;

send permission data to the second service provider indicating whether the permission exists;

receive a request associated with the first online service for the execution of the second online service; and control the execution of the second online service based at least in part on the permission data.

2. The system of claim 1, wherein the execution of the second online service is controlled by at least:

determining that the permission data excludes the permission for the execution of the second online service; and preventing the execution of the second online service based at least in part on the permission data.

3. The system of claim 1, wherein the first account data further enables execution of the first online service of the first service provider to provide a third online service of a third service provider, and wherein the one or more memory storing instructions that, upon execution by the one or more processors, configure the system to:

receive, from the third service provider, fourth account data of the user with the third service provider having a third schema; and generate, based at least in part on a second mapping between the third schema and the second schema, fifth account data by reformatting the fourth account data from the third schema to the second schema.

4. The system of claim 1, wherein the execution of the second online service is controlled by at least permitting or preventing the execution of the second online service based at least in part on the permission data.

5. A computer-implemented method, comprising:

storing first account data of a user with a first service provider, the first account data enabling execution of a first online service of the first service provider to provide a second online service of a second service provider;

receiving, from the second service provider, second account data of the user with the second service provider, the second account data having a first schema;

generating, based at least in part on a mapping between the first schema and a second schema, third account data by reformatting the second account data from the first schema to the second schema;

generating, based at least in part on the first account data and the third account data, a report associated with controlling execution of the second online service, the report indicating whether a permission exists for executing the second online service; and sending permission data to the second service provider to control the execution of the second online service, the permission data indicating whether the permission exists.

6. The computer-implemented method of claim 5, further comprising:

generating an application programming interface (API) call to a computing resource of the second service provider, the API call requesting the second account data;

receiving, from the computing resource, a response to the API call, the response including the second account data;

receiving a request associated with the first online service for the execution of the second online service; and controlling the execution of the second online service based at least in part on the permission data.

7. The computer-implemented method of claim 5, further comprising:

determining a mismatch between the first account data and the second account data; and causing a presentation of a notification indicating the mismatch at a user device.

8. The computer-implemented method of claim 5, further comprising:

determining a mismatch between the first account data and the second account data; and generating updated second account data that matches the first account data based at least in part on the mismatch; and sending the updated second account data to the second service provider.

9. The computer-implemented method of claim 5, further comprising:

receiving an indication of a configuration for the report from the second service provider; and generating the report based at least in part on the configuration.

10. The computer-implemented method of claim 5, wherein the first account data indicates a permission level for the user associated with the execution of the second online service, and wherein the computer-implemented method further comprises:

determining an update to the permission level in the first account data; and causing a presentation of a notification indicating the update at a user device.

11. The computer-implemented method of claim 5, wherein the first account data indicates a permission level for the user associated with the execution of the second online service, and wherein the computer-implemented method further comprises:

determining an update to the permission level in the first account data;

generating updated second account data associated with the updated permission level based at least in part on the update; and sending the updated second account data to the second service provider.

12. The computer-implemented method of claim 5, further comprising:

determining a removal of the first account data from the first service provider; and sending a notification of the removal to the second service provider.

13. One or more non-transitory computer-readable storage media storing instructions that, upon execution on a system, cause the system to perform operations comprising:

storing first account data of a user with a first service provider, the first account data enabling execution of a first online service of the first service provider to provide a second online service of a second service provider;

receiving, from the second service provider, second account data of the user with the second service provider, the second account data having a first schema;

generating, based at least in part on a mapping between the first schema and a second schema, third account data by reformatting the second account data from the first schema to the second schema;

generating, based at least in part on the first account data and the third account data, a report associated with controlling execution of the second online service, the report indicating whether a permission exists for executing the second online service; and sending permission data to the second service provider to control the execution of the second online service, the permission data indicating whether the permission exists.

14. The one or more non-transitory computer-readable storage media of claim 13, wherein the report includes account data for a plurality of users across a plurality of online services of a plurality of service providers, wherein the plurality of users includes the user, wherein the plurality of online services includes the second online service, and wherein the plurality of service providers includes the second service provider.

15. The one or more non-transitory computer-readable storage media of claim 13, wherein the operations further comprise:

receiving the mapping as a user input via a user interface of a user device.

16. The one or more non-transitory computer-readable storage media of claim 13, wherein the operations further comprise controlling the execution of the second online service based at least in part on the permission data by at least:

determining that the permission data excludes the permission for the execution of the second online service; and preventing the execution of the second online service based at least in part on the permission data.

17. The one or more non-transitory computer-readable storage media of claim 13, wherein the operations further comprise controlling the execution of the second online service based at least in part on the permission data by at least:

determining that the permission data includes the permission for the execution of the second online service; and causing the execution of the second online service based at least in part on the permission data.

18. The one or more non-transitory computer-readable storage media of claim 13, wherein the first account data further enables execution of the first online service of the first service provider to provide a third online service of a third service provider, wherein the mapping comprises a first mapping, and wherein the operations further comprise:

receiving, from the third service provider, fourth account data of the user with the third service provider having a third schema; and generating, based at least in part on a second mapping between the third schema and the second schema, fifth account data by reformatting the fourth account data from the third schema to the second schema.

19. The one or more non-transitory computer-readable storage media of claim 13, wherein the operations further comprise:

determining a mismatch between the first account data and the second account data;

generating updated second account data that matches the first account data based at least in part on the mismatch; and sending the updated second account data to the second service provider.

20. The one or more non-transitory computer-readable storage media of claim 13, wherein the first account data indicates a permission level for the user associated with the execution of the second online service, and wherein the operations further comprise:

determining an update to the permission level in the first account data;

generating updated second account data associated with the updated permission level based at least in part on the update; and sending the updated second account data to the second service provider.

* * * * *